United States Patent
Horiguchi et al.

[11] 3,950,073
[45] Apr. 13, 1976

[54] ECCENTRIC CORE OPTICAL WAVEGUIDE

[75] Inventors: Masaharu Horiguchi, Urizura; Takao Edahiro; Kunio Masuno, both of Mito; Tadashi Miyashita, Hitachi; Shiro Takahashi, Mito, all of Japan

[73] Assignee: Nippon Telegraph & Telephone Public Corporation, Tokyo, Japan

[22] Filed: May 23, 1974

[21] Appl. No.: 472,758

[30] Foreign Application Priority Data
May 23, 1973 Japan.................................. 48-57311

[52] U.S. Cl........................... 350/96 WG; 350/96 M
[51] Int. Cl.²............................................ G02B 5/14
[58] Field of Search .............................. 350/96 WG

[56] References Cited
UNITED STATES PATENTS
3,712,705    1/1973    Marcatili...................... 350/96 WG OTHER PUBLICATIONS
Miyashita et al., "Journal of Applied Physics," Feb. 1974, pp. 808–809.

*Primary Examiner*—R. V. Rolinec
*Assistant Examiner*—Darwin R. Hostetter
*Attorney, Agent, or Firm*—Sughrue, Rothwell, Mion, Zinn & Macpeak

[57] ABSTRACT

An eccentric core optical waveguide comprising at least one glass core having relatively large refraction index disposed in an outer cylindrical glass jacket having larger diameter than that of the glass core and relatively small refraction index. The one or more glass core being so arranged as to make tangential contact with the inner wall of the glass jacket or a dielectric thin film coated inside the jacket at a small area. The space between the glass core and the outer glass jacket or said thin film is filled by air.

11 Claims, 5 Drawing Figures

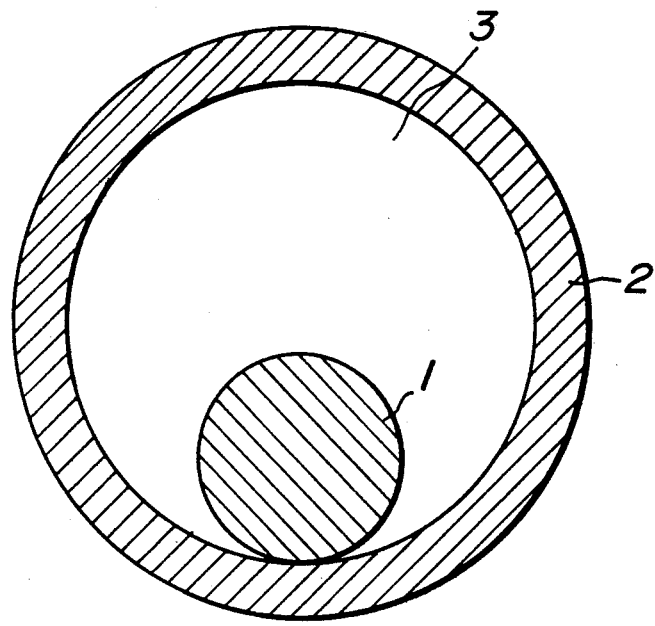
FIG_1

FIG_2
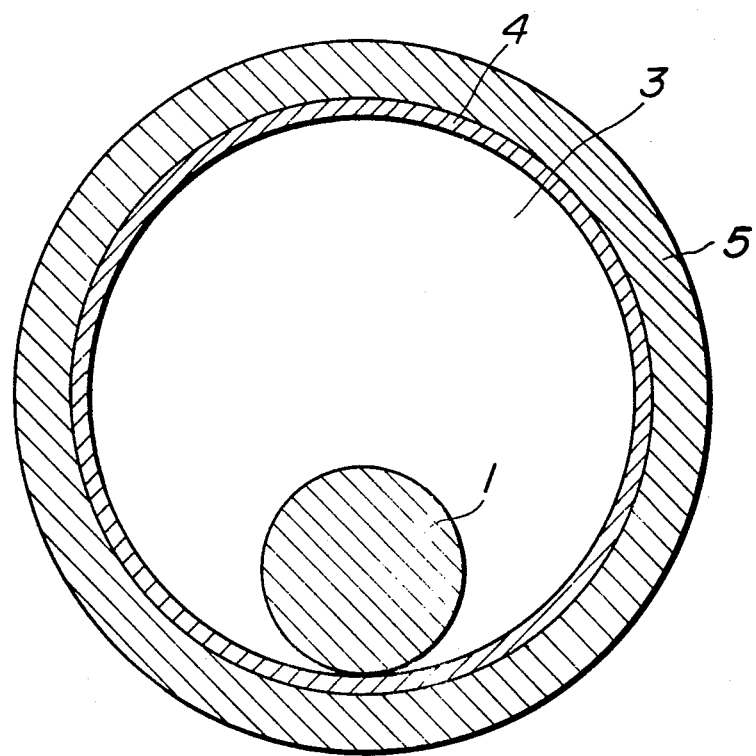

FIG_3a
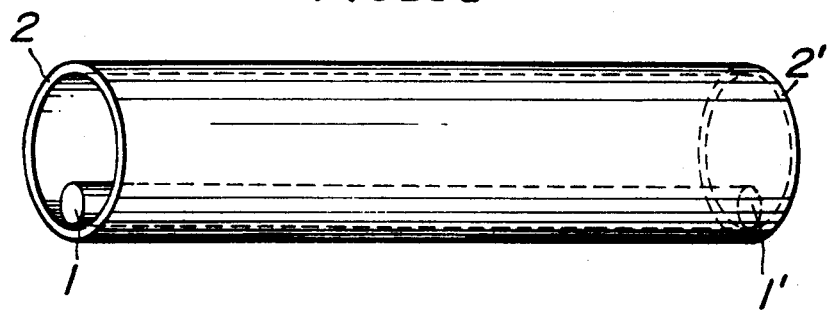
FIG_3b
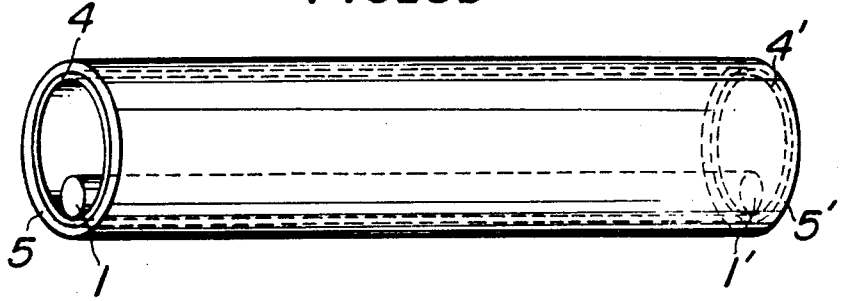

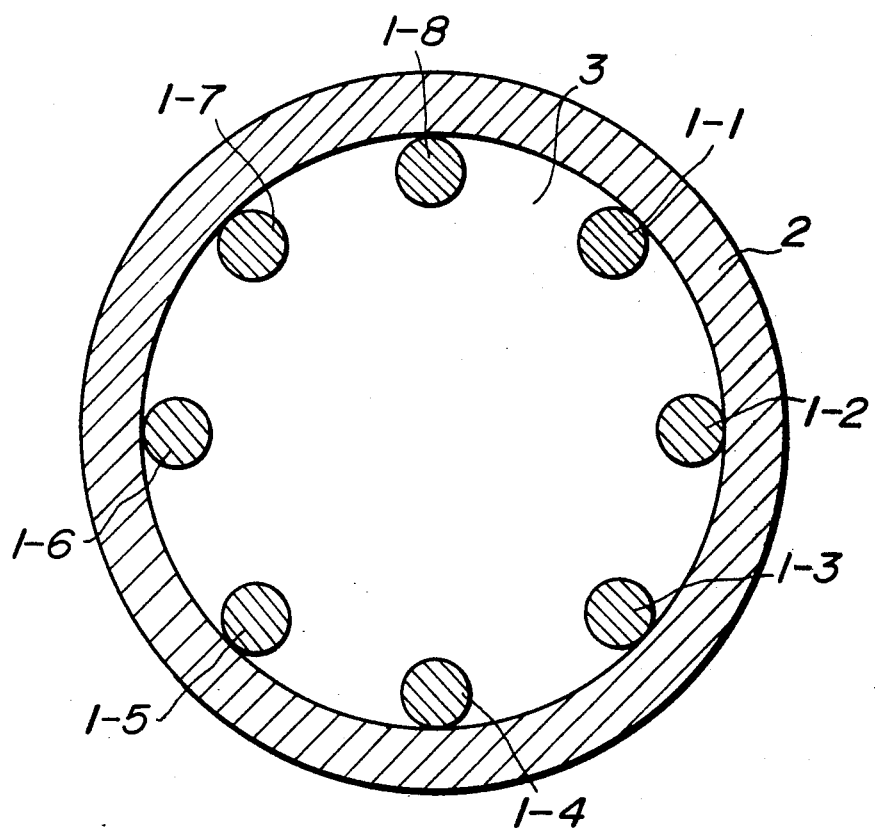
FIG_4

ECCENTRIC CORE OPTICAL WAVEGUIDE

BACKGROUND OF THE INVENTION

1. Field of the Invention

The present invention relates to a glass optical waveguide for use in light communication purpose, more particularly, the invention relates to an eccentric core optical waveguide.

2. Description of the Prior Art

An optical glass fiber of the known type consists of a central core portion having relatively high refractive index for passing light and a sorrounding cladding or jacket portion having relatively low refractive index. In the manufacture of such known glass fiber, an irregularity might occur, for instance, bubbles may be occluded between the core and the cladding. In such an occasion, deterioration of characteristics of the product, such as for causing a large scattering loss, is inavoidable. In order to overcome such difficulties, a construction, in which the core is supported in air, has been suggested. For instance, P. Kaiser, E. A. J. Marcatili, and S. E. Miller disclosed in Bell System Technical Journal (B.S.T.J.) Vol. 52, No. 2, February 1973 pp 265-269, a single material construction for holding central core by providing a supporting slab in a pipe. Both the core and the pipe are made from an identical material such as silica. This construction is called as single-material (SM) fiber.

Also Marcatili U.S. Pat. No. 3,712,705 disclosed an air clad optical fiber comprising core having polygonal cross section disposed within an outer protective circular jacket so that the core contacts the outer jacket solely along the vertices formed by adjacent pairs of sides. In the Marcatili U.S. Pat. No. 3,712,705, it is mentioned that the jacket of the optical fiber is more of a protective member and, hence, its optical properties are of less importance than are the optical properties of the cladding of a conventional optical fiber. In such a Marcatili airclad fiber guide comprising a polygonal core supported within a circular outer jacket, the light is basically transmitted concentratedly in the polygonal core by the geometrical effect. Due to such constructive principle of the known type optical fiber, the light may leak from the core to outside, when the optical fiber is bent. Furthermore, in the manufacture of such known optical fibers, a stringent requirement is imposed for the form and dimension of the parts.

SUMMARY OF THE INVENTION

The present invention has for its object to obviate an increase of scattering loss in the known construction of the optical fiber and also to overcome the aforementioned difficulty in the single material fiber or the air clad optical fiber.

According to one aspect of the invention, an optical waveguide is formed of at least one column shaped glass core and a cylindrical glass jacket having relatively lower refraction index and large inner diameter. Space between the glass core and the cylindrical glass jacket is filled by air, and the glass core makes a tangential contact with the jacket at a very small part thereof.

As the optical waveguide has a construction, in which the core is arranged eccentrically with the cylindrical glass jacket, the optical waveguide may be termed as "an eccentric core optical waveguide". In the eccentric core optical waveguide according to the present invention, the light transmission core contacts at a small part of the glass jacket having lower refraction index so that substantial rest surface of the core is surrounded by air. The contact area between the core and the outer glass jacket is very small. Therefore occlusion of bubbles or inclusions in the manufacture may be avoided and the scattering loss is kept at a very low value.

Also besides of the scattering loss, the dispersion is a very important characteristic in an optical waveguide as a light transmission medium which might affect for the transmission band. The dispersion is greatly in dependence upon a difference of refraction indices at the tangential contact of the core and the jacket. In the eccentric core optical waveguide made in accordance with the invention, substantial portion of the outer surface of the core is surrounded by air. The optical propagation characteristics in the core may be decided by the tangential contact portion between the core and outer cylindrical jacket having lower refraction index. Therefore, by selecting the refraction index of the outer jacket the optical propagation characteristics may be controlled.

More detailed construction of the eccentric core optical fiber according to the present invention will be described by referring to the accompanied drawings together with its manufacturing process and the optical propagation characteristics thereof.

BRIEF DESCRIPTION OF THE DRAWINGS

FIG. 1 is a cross-sectional view of an eccentric core optical waveguide according to one embodiment of the present invention;

FIG. 2 is a cross-sectional view of a different embodiment of the eccentric core optical waveguide of the present invention;

FIGS. 3a and 3b are perspective views showing two embodiments of preform for manufacturing eccentric core optical waveguides, in which FIG. 3a is a case of using low refraction index outer jacket and FIG. 3b is a case using a low refraction index glass film coating inside the jacket; and FIG. 4 is a cross-sectional view of still modified embodiment of an eccentric core optical waveguide of the present invention, which comprises 8 cores.

DETAILED DESCRIPTION OF THE PREFERRED EMBODIMENTS

FIG. 1 shows a cross-section of an embodiment of an eccentric core optical waveguide made in accordance with the present invention. In FIG. 1, a glass core 1 is disposed eccentrically in a hollow cylindrical glass jacket 2. Space 3 between the core 1 and the jacket 2 is filled by air. The core glass 1 is made of fused silica, which in this specification referred in view of simplification also to as silica. One example of such silica glass core has its refraction index of 1.4571 measured by He-Ne laser having wavelength of 6328 A.

In order to obtain more higher refraction index of the core glass, it is possible to use doped silica having relatively high refraction index by adding oxides of metals such as, aluminium, germanium, gallium, arsenic, antimony, niobium, phosphorus, etc. to the fused silica. For example, a doped silica having composition of $SiO_2:Al_2O_3=90:10$ has refraction index ND=1.468, which is substantially larger than the refraction index ND=1.458 of the fused silica mentioned above. Herein ND generally means refraction index for sodium D line.

The cylindrical glass jacket 2 forming cladding or outer tube is made of borosilicate glass having following composition for example.

| | |
|---|---|
| $SiO_2$: | 96.68 Wt.% |
| $B_2O_3$: | 2.9 Wt.% |
| $Al_2O_3$: | 0.4 Wt.% |
| $Na_2O$: | 0.02 Wt.% |

The glass jacket having above composition shows refraction index of 1.4562 measured by He-Ne laser having wavelength of 6328 A.

If the doped silica having relatively larger refraction index is used for the core glass, the fused silica having relatively lower refraction index may be used for the outer jacket. As can be seen from the foregoing, the refraction index of the core glass 1 is larger than that of the outer cylindrical glass jacket 2. Since the space 3 between the core glass 1 and the outer jacket 2 is filled by air, it can be said that approximately 98% of the circumferences of the core glass 1 is surrounded by air. Accordingly, the interface between the core glass 1 and the air is kept optically quite homogeneous condition so that the scattering can extremely be minimized. Furthermore, the core glass 1 and the outer cylindrical jacket 2 contact each other tangentially at a small area. Therefore the contact area can be made very small from the construction principle of the waveguide and the chances of occlusion of bubbles and inclusions at the time of manufacture may be kept very low. From this fact the scattering loss is very small.

FIG. 2 shows cross-section of an eccentric core optical waveguide of a different embodiment of the present invention.

In FIG. 2, 1 shows a glass core made of silica and 5 is a cylindrical glass jacket. Space 3 between the core glass 1 and the jacket 5 is filled by air. A dielectric thin film 4 is coated on the inner wall surface of the outer cylindrical silica jacket 5. The film 4 is made of dielectric material having refraction index lower than that of silica glass jacket and made of for instance $SiO_2$-$B_2O_3$ glass. The silica glass core 1 contacts on the $SiO_2$-$B_2O_3$ glass film 4 coated on the inner wall of the outer cylindrical silica glass jacket 5. The more exact composition of the $SiO_2$-$B_2O_3$ glass film is $SiO_2$:86 Wt.%; $B_2O_3$ 14 Wt.% and the refraction index by sodium D line ND is 1.457. The refraction index of the silica glass core ND=1.458. The film thickness of the $SiO_2$-$B_2O_3$ glass film should be so selected as several times larger than the wavelength of the light to be transmitted. In this construction, the silica glass 1 is fused to the inner wall of the outer silica jacket 5 through thin glass film 4 having low refraction index so that the dispersion loss at the contact portion between the core and the thin film can be made very small.

FIGS. 3a and 3b show perspective views of preforms for manufacturing the eccentric core optical waveguide of the present invention. FIG. 3a is a preform for manufacturing the eccentric core optical waveguide as shown in FIG. 1, and FIG. 3b is a preform for manufacturing the eccentric core optical waveguide as shown in FIG. 2. In FIGS. 3a and 3b, core glass 1(1') of silica rod having circular cross-section is arranged in a cylindrical glass jacket 2(2') for holding the same. In FIG. 3a, the jacket 2(2') is a $SiO_2$—$B_2O_3$ glass tube having composition explained by referring to FIG. 1. In FIG. 3b, the jacket 5(5') is a silica glass tube. A low refraction index thin glass film 4(4') of $SiO_2$—$B_2O_3$ having composition as explained in FIG. 2 is coated inside of the outer silica glass tube 5(5'). In the preform shown in the drawing, the glass core 1(1') and the cylindrical glass jacket 2(2') or 5(5') are fixed by fusing together only at either axial ends of the tube.

The preform is at first heated by a high frequency heater and then fabricated by a glass fiber drawing apparatus. In the fabrication process, the glass core 1 and the glass jacket 2 or 5 are fused together at the contact area and the eccentric core optical waveguides having construction shown in FIGS. 1 and 2 may be manufactured. As for example, a $SiO_2$—$B_2O_3$ glass tube for jacket having outer diameter of 10 mm and inner diameter of 8 mm and silica rod for the core having 3 mm diameter are used and fabricated at 1,800–2,200°C by a glass fiber drawing apparatus. As a result an eccentric core fiber having the jacket outer diameter 150 $\mu$m and inner diameter 120 $\mu$m and glass core of diameter 40 $\mu$m is obtained. The fusing area of the glass core with the jacket is observed as about 2% of the overall outer surface of the core and deformation of the glass core from a geometrical circle is less than about 0.1%.

The modified embodiment of an eccentric core waveguide according to the present invention, in which a thin film having lower refraction index than that of the core glass is applied to an inner wall of the outer cylindrical cladding will be explained hereinafter. At first an inner wall surface of a silica glass tube having outer diameter of 10 mm$\phi$ and inner diameter of 8 mm$\phi$ is smoothly ground by a suitable means, such as a mechanical means, chemical etching process or fire polishing process, etc. Then inner wall of the silica jacket is coated by a film of $SiO_2$—$B_2O_3$ glass by chemical vapor deposition. In the method of coating of $SiO_2$—$B_2O_3$ glass film, a mixture of gas of boron tribromide ($BBr_3$) and silicon tetrachloride ($SiCl_4$) and nitrogen as a carrier gas is used. The gas mixture is supplied to an oxy-hydrogen torch provided at one end of said cylindrical silica tube and burned with said oxy-hydrogen torch. In this case $BBR_3$ and $SiCl_4$ will heat decompose and fine grains of $B_2O_3$ and $SiO_2$ are produced. The fine grains of $B_2O_3$ and $SiO_2$ are blown onto the inner wall of the silica tube and deposited thereon. At the same time the deposite is melted to form glass by the oxy-hydrogen torch and thus $SiO_2$—$B_2O_3$ glass film can be obtained. Composition of $SiO_2$—$B_2O_3$ glass film may be controlled by adjusting the heating temperature of boron tribromide and silicon tetrachloride and by adjusting flow of nitrogen carrier gas. In stead of boron tribromide use can be made of boron trichloride, trimethyl borate, triethyl borate, tributyl borate and diborane. In stead of silicon tetrachloride use can be made of monochloro-silane, dichloro-silane, trichloro-silane.

After formation of $SiO_2$—$B_2O_3$ thin glass film on inner wall of silica glass tube, a silica glass rod of 3 mm$\phi$ diameter having smooth surface is placed to contact with the inner wall of the jacket coated with $SiO_2$—$B_2O_3$ thin film and either ends of the glass rod are fused to the inner wall of said cylindrical tube. Then the preform comprising silica glass core 1, silica glass tube 5 and the thin glass film 4 is fabricated by drawing apparatus at a temperature range of 1,800°–2,200°C. An eccentric core optical waveguide is obtained by said process in which radius of the glass core is 15 $\mu$m, thickness of $SiO_2$—$B_2O_3$ glass thin film is 3 $\mu$m, thickness of outer silica glass jacket is 30 $\mu$m and the outer diameter of the jacket is 120 $\mu$m. In this eccentric core fiber construction, and the the parts other than the low refraction index $SiO_2-B_2O_3$ thin film, i.e. the glass core 1 and the outer cylindrical jacket are made from an identical silica glass so that strain and deformation or irregularities due to difference of melting temperature can be kept very small. Accordingly an eccentric core fiber construction having comparatively uniform configuration can be obtained and the cross-section of the core glass can be made substantially real circle.

The necessary characteristics of such eccentric core optical waveguide made by the process mentioned above used as a light transmission medium, such as the pulse transmission, have been measured.

The measuring method is same as disclosed in the report by D. Gloge, E. L. Chrinnock, T. P. Lee et al., (IEEE J. Quntum Electronics. Vol. QE8 Nov., pp 844–846 (1972)). The measured result is shown in Table 1. In the Table 1, silica core clad A represents a fiber having cladding of $SiO_2$ and $B_2O_3$ powder on a surface of the silica core, silica core clad B represents a fiber having cladding of same material for instance of $BBr_3$ and $SiCl_4$ by chemical deposition. Besides, an eccentric core optical waveguide "A" represents one made according to the present invention and having construction in which a silica glass core is provided to contact at inner wall of the outer $SiO_2-B_2O_3$ glass cylindrical jacket as shown in FIG. 1. The eccentric core optical waveguide "B" corresponds to an embodiment shown in FIG. 2 and in which the inner wall of the outer silica glass tube is coated by a thin film of $SiO_2-B_2O_3$ by chemical vapor deposition of $BBr_3$ and $SiCl_4$ and to which the silica core is provided to contact with the inner surface thereof. The measurement of the pulse transmission has been made by using Ga-As semiconductor laser having its wavelength of 0.905 $\mu$.

Table 1

| Sample | Total Loss dB/Km at 0.63 $\mu$ | Measured length (m) | Pulse broadening ns/Km |
|---|---|---|---|
| Silica Core Clad A ($SiO_2+B_2O_3$) powder clad | 58 | 197 | 0.96 |
| Silica Core Clad B ($BBr_3+SiCl_4$) chemical vapor deposition clad | 36 | 235 | 2.73 |
| Eccentric core optical waveguide A (FIG. 1) | 30 | 110 | 0.73 |
| Eccentric Core optical waveguide B (FIG. 2) | 20 | 55 | 2.0 |

As shown in the table, the eccentric core optical waveguide according to the present invention shows at least equivalent or much more excellent transmission characteristics compared with conventional clad type optical waveguide. In the eccentric core optical waveguide of the present invention, the substantial part of the core glass is surrounded by air. Accordingly, the interface between the core glass and the air layer is optically homogeneous. In addition to the fact that the contact area between the core and the outer glass jacket can be made very small, there is provided a difference of refraction index so that there is no leakage of light from the core to outside. Furthermore, the optical waveguide has a construction sufficiently durable for bending.

As a modified embodiment of the present invention, FIG. 4 shows an eccentric core optical waveguide comprising a plurality of glass cores. According to this modified embodiment a multiple transmission paths by one line can be realized. In this embodiment, a plurality of glass cores are fused at inner wall of cylindrical glass tube and fabricated by the same process described in the foregoing. In order to realize a multi-path transmission line by using the eccentric core optical waveguide as shown in FIG. 4, the minimum interval of adjacent glass cores should be selected more than 10 times of radius of a glass core in view of mutual interference of light signal transmitting in each of the glass core. The interference is termed as cross-talk. By arranging the minimum interval as more than 10 times of radius of a glass core, a multi-path optical waveguide having very small cross-talk can be realized.

As an example using glass cores having diameter of 2 $\mu m$ and assuming that the inner diameter of the outer glass jacket is 150 $\mu m$ and making interval of adjacent pair of glass cores as 20 times of radius of a glass core, then the number of the glass cores will be 24. In this case a cross-talk from a nearest optical path may be a value of 180 dB assuming the difference of refraction indices of the core glass and that of the jacket. Even considering altogether 24 light paths the expected cross-talk will be more than 160 dB so that the cross-talk can be made to a sufficiently small value.

If it is desired to further minimize the interval between adjacent cores, it is possible to arrange a partition of non-light transmitting material for instance a glass partition including transition metal element having a large light absorbing characteristics between each pair of adjacent glass cores. By the provision of such partition of non-light transmitting material the minimum interval of adjacent cores can further be decreased.

Various modifications of the present invention will be possible without departing from the spirit of the present invention which will be defined in the appended claims.

What we claim is:

1. An eccentric core optical waveguide comprising a right circular cylindrical glass core having refraction index $n_1$, an outer cylindrical glass jacket having larger inner diameter than diameter of the glass core and having refraction index $n_2$, and a space between the glass core and the outer cylindrical glass jacket filled with air, the glass core is so arranged as to tangential contact with the inner wall of the said outer cylindrical glass jacket, wherein said refraction indices have a relationship of:

$$n_1 > n_2$$

2. An eccentric core optical waveguide as claimed in claim 1, wherein the cylindrical glass core is formed of fused silica.

3. An eccentric core optical waveguide as claimed in claim 1, wherein said cylindrical glass core is made of doped silica including at least one oxide of metals selected from the group consisting of aluminium, germanium, gallium, arsenic, antimony, niobium, and phosphorus.

4. An eccentric core optical waveguide as claimed in claim 1, wherein the outer cylindrical glass jacket is made of borosilicate ($SiO_2-B_2O_3$) glass having following composition:

| | |
|---|---|
| $SiO_2$ | 96.68 Wt.% |
| $B_2O_3$ | 2.9 Wt.% |
| $Al_2O_3$ | 0.4 Wt.% |
| $Na_2O$ | 0.02 Wt.% |

5. An eccentric core optical waveguide comprising a right circular cylindrical glass core having refraction index $n_1$, an outer cylindrical glass jacket having larger inner diameter than diameter of the glass core, inner wall of the outer jacket is coated with dielectric thin film having refraction index $n_3$, and a space between the glass core and the outer cylindrical glass jacket filled with air, the glass core is so arranged as to contact at minor portion of the inner wall of said dielectric thin film, wherein said refraction indices have relationship of:

$$n_1 > n_3$$

6. An eccentric core optical waveguide as claimed in claim 5, wherein the cylindrical glass core is formed of fused silica.

7. An eccentric core optical waveguide as claimed in claim 5, wherein said cylindrical glass core is made of doped silica including at least one oxide of metals selected from the group consisting of aluminium, germanium, arsenic, antimony, niobium, and phosphorus.

8. An eccentric core optical waveguide as claimed in claim 5, wherein the outer cylindrical glass jacket is made of fused silica and the dielectric thin film is made of borosilicate ($SiO_2$-$B_2O_3$) glass having following composition:

| | |
|---|---|
| $SiO_2$ | 86.0 Wt.% |
| $B_2O_3$ | 14.0 Wt.% |

9. An eccentric core optical waveguide comprising a right circular cylindrical glass core of fused silica, an outer cylindrical glass jacket of borosilicate glass having larger inner diameter than diameter of the glass core and a space between the glass core and the outer cylindrical glass jacket filled with air, wherein the glass core is so arranged as to contact with inner wall of the outer cylindrical glass jacket at a small part which is about 2% of peripheral surface of the glass core.

10. An eccentric core optical waveguide comprising a right circular cylindrical glass core of fused silica, an outer cylindrical glass jacket having larger inner diameter than diameter of the glass core of which inner wall is coated with thin film of borosilicate glass, and a space between the glass core and the borosilicate glass thin film filled with air, wherein the silica glass core is so arranged as to contact with inner wall of said borosilicate glass thin film at a small part which is about 2% of peripheral surface of the glass core.

11. An eccentric core optical waveguide comprising a plurality of right circular cylindrical glass cores of fused silica, an outer cylindrical glass jacket of borosilicate glass having inner diameter much larger than diameter of the fused silica glass core, and a space between the plurality of cores and the outer cylindrical glass jacket filled with air, wherein said plurality of glass cores are so arranged as to contact at small portion of the core and that interval between each adjacent pair of cores is at least 10 times of radius of the core.

* * * * *